No. 858,140. PATENTED JUNE 25, 1907.
R. W. BEATON.
HANGER.
APPLICATION FILED JULY 3, 1906
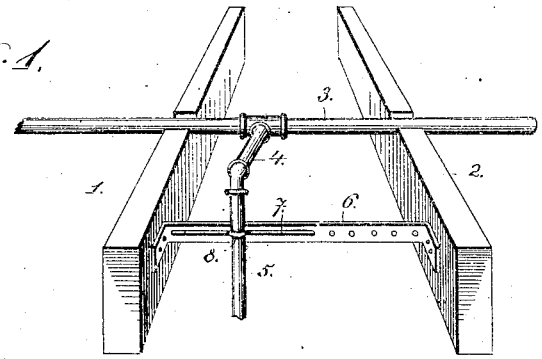
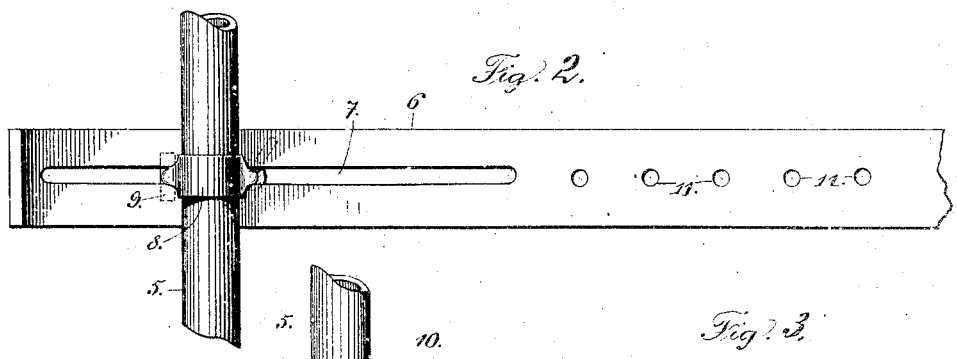
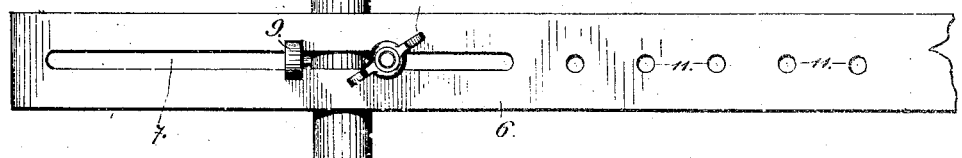
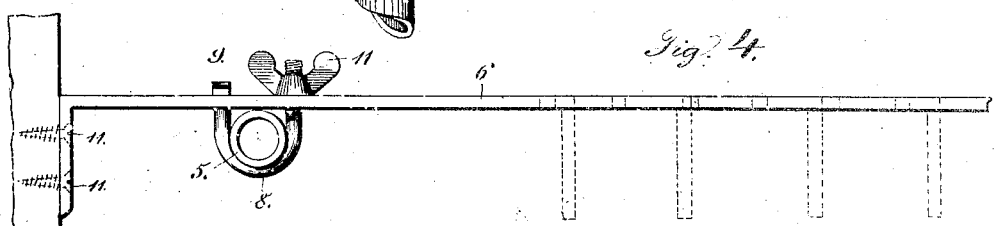
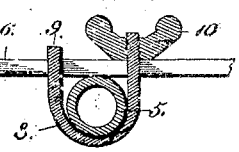
Witnesses:
A. H. Rabság
E. E. Potter
Inventor
Robert W. Beaton
by N. C. Everitt
Attorneys

UNITED STATES PATENT OFFICE.

ROBERT W. BEATON, OF CHICAGO, ILLINOIS.

HANGER.

No. 858,140.         Specification of Letters Patent.         Patented June 25, 1907.

Application filed July 3, 1906. Serial No. 324,626.

*To all whom it may concern:*

Be it known that I, ROBERT W. BEATON, a citizen of the United States of America, residing at Chicago, in the county of Cook and State of Illinois, have invented certain new and useful Improvements in Hangers, of which the following is a specification, reference being had therein to the accompanying drawing.

This invention relates to hangers for gas pipes, and the object is to provide a simple and inexpensive hanger for supporting and securing gas pipes between adjacent joists in a building.

A further object of the invention is to provide a device of the character indicated which will be adapted to secure a pipe at any point between two joists.

The invention consists of a supporting-bar formed from a single strip of material provided with a longitudinal slot and a series of perforations for nails or screws, in combination with a pipe clamp of novel form.

The construction of the improvement will be fully described hereinafter in connection with the accompanying drawing which forms a part of the specification, and its novel features will be defined in the appended claims.

In the drawing, Figure 1 is a view in perspective of the hanger applied to a gas pipe and in position between two joists, Fig. 2 is an elevation of one side of the hanger applied to a pipe, Fig. 3 is a similar view of the opposite side of the device, Fig. 4 is a top plan view of the same, and Fig. 5 is a horizontal section of the pipe holder or clamp.

The reference numerals 1 and 2 designate two adjoining parallel joists supporting a gas pipe 3, from which extends a branch pipe 4 the depending portion 5 of which extends between the joists. The hanger comprises a supporting-bar 6 formed from a single strip of sheet metal, provided with a central longitudinal slot 7, preferably extending for a little more than one-half the length of the space between the joists, thus adapting the bar to support a pipe at any point between the joists, by placing the slotted portion of the bar next to the pipe.

Within the slot 7 is arranged a pipe clamp or holder consisting of a U-shaped bolt 8 one arm of which is provided with a head 9 of greater width than the slot, and the other arm of which is threaded to receive a butterfly nut 10. This U-shaped clamping bolt may be readily moved to any point within the slot 7 and there held by tightening the nut 10 against the bar. As clearly shown in the drawing, the clamp embraces the pipe 5 and firmly secures it to the supporting-bar.

On each side of the slot 7 the bar is formed with openings 11 for the nails or screws that secure it to the joists. The ends of the bar are bent to conform to the space between the joists, and it will be apparent from the illustration in the drawing that the fastener may be applied to a pipe at any point between the joists. If the pipe is near the joist 1 as shown in Fig. 1, the slotted end of the bar is placed toward that joist, but if the pipe were nearer the joist 2, the position of the slotted bar would be reversed to bring the slot across the pipe. The bar may be bent at any point desired, to fit the space between the joists as indicated by dotted lines in Fig. 4.

What I claim and desire to secure by Letters Patent, is:—

1. A pipe hanger comprising in combination, a supporting bar, slotted longitudinally adjacent one end, and a substantially U-shaped clamp, the arms of which project through the slot in the bar and are movable therein, one of said arms having a head on its free end and the other being threaded, and a nut on said threaded end.

2. A pipe hanger, comprising a single strip of metal formed with a longitudinal slot, and a plurality of perforations, in combination with a U-shaped clamp movably mounted within said slot, and provided with a head at one end, and screw-threaded at its opposite end, said headed-end and screw-threaded end projecting through the slot, and a nut on said threaded end.

In testimony whereof I affix my signature in the presence of two witnesses.

ROBERT W. BEATON.

Witnesses:
- CELIA M. KEIM,
- ALICE M. AUSTIN.